(12) United States Patent
Luft et al.

(10) Patent No.: US 8,374,102 B2
(45) Date of Patent: Feb. 12, 2013

(54) INTELLIGENT COLLECTION AND MANAGEMENT OF FLOW STATISTICS

(75) Inventors: Siegfried J. Luft, Vancouver (CA); Jonathan Back, Vancouver (CA)

(73) Assignee: Tellabs Communications Canada, Ltd., Toronto, Ontario (CA)

( * ) Notice: Subject to any disclaimer, the term of this patent is extended or adjusted under 35 U.S.C. 154(b) by 372 days.

(21) Appl. No.: 11/906,795

(22) Filed: Oct. 2, 2007

(65) Prior Publication Data
US 2009/0086651 A1  Apr. 2, 2009

(51) Int. Cl.
*H04L 12/26* (2006.01)
(52) U.S. Cl. ........ 370/253; 709/223; 709/224; 709/225; 709/226
(58) Field of Classification Search .................. 370/223, 370/392, 396, 219, 229–253; 709/223–226
See application file for complete search history.

(56) References Cited

U.S. PATENT DOCUMENTS

| | | | |
|---|---|---|---|
| 4,720,850 A | 1/1988 | Oberlander et al. | |
| 4,893,302 A | 1/1990 | Hemmady et al. | |
| 5,428,781 A | 6/1995 | Duault et al. | |
| 5,673,382 A | 9/1997 | Cannon et al. | |
| 6,111,852 A | 8/2000 | Leung et al. | |
| 6,148,410 A | 11/2000 | Baskey et al. | |
| 6,262,974 B1 | 7/2001 | Chevalier et al. | |
| 6,320,863 B1 | 11/2001 | Ramfelt | |
| 6,412,000 B1 | 6/2002 | Riddle et al. | |
| 6,587,470 B1 | 7/2003 | Elliot et al. | |
| 6,608,832 B2 | 8/2003 | Forslow | |
| 6,615,262 B2 | 9/2003 | Schweitzer et al. | |
| 6,618,355 B1 | 9/2003 | Gulliford et al. | |
| 6,678,281 B1 | 1/2004 | Chakrabarti et al. | |
| 6,694,450 B1 | 2/2004 | Kidder et al. | |
| 6,741,595 B2 | 5/2004 | Maher et al. | |
| 6,751,191 B1 | 6/2004 | Kanekar et al. | |
| 6,779,030 B1 | 8/2004 | Dugan et al. | |
| 6,789,116 B1 | 9/2004 | Sarkissian et al. | |
| 6,807,156 B1 * | 10/2004 | Veres et al. .................. | 370/252 |
| 6,847,613 B2 | 1/2005 | Mimura et al. | |
| 6,873,600 B1 | 3/2005 | Duffield et al. | |
| 6,920,109 B2 | 7/2005 | Yazaki et al. | |

(Continued)

FOREIGN PATENT DOCUMENTS

| | | |
|---|---|---|
| CA | 1 295 391 | 2/1992 |
| CA | 2 276 526 A1 | 7/1998 |

(Continued)

OTHER PUBLICATIONS

Cisco Systems, "NetFlow Service Solution Guide", last updated Janury 22, 2007.*

(Continued)

*Primary Examiner* — Charles C Jiang
(74) *Attorney, Agent, or Firm* — Hamilton, Brook, Smith & Reynolds, P.C.

(57) ABSTRACT

A system and method for collecting packet flow statistics within a network node includes forwarding packet flows received at the network node between subscribers of one or more network services and one or more providers of the network services. The flow statistics related to each of the packet flows passing through the network node are collected and statistics summaries are generated in real-time within the network node summarizing the flow statistics on a per subscriber basis.

28 Claims, 10 Drawing Sheets

U.S. PATENT DOCUMENTS

| | | |
|---|---|---|
| 6,944,673 B2 | 9/2005 | Malan et al. |
| 6,948,003 B1 | 9/2005 | Newman et al. |
| 6,961,539 B2 | 11/2005 | Schweinhart et al. |
| 6,968,394 B1 | 11/2005 | El-Rafie |
| 6,985,431 B1 | 1/2006 | Bass et al. |
| 7,002,977 B1 | 2/2006 | Jogalekar |
| 7,085,230 B2 | 8/2006 | Hardy |
| 7,120,931 B1 | 10/2006 | Cheriton |
| 7,143,006 B2 | 11/2006 | Ma et al. |
| 7,203,169 B1 | 4/2007 | Okholm et al. |
| 7,251,215 B1 | 7/2007 | Turner et al. |
| 7,257,616 B2 | 8/2007 | Bass et al. |
| 7,272,115 B2 | 9/2007 | Maher, III et al. |
| 7,289,433 B1 | 10/2007 | Chmara et al. |
| 7,299,277 B1 | 11/2007 | Moran et al. |
| 7,376,731 B2 | 5/2008 | Khan et al. |
| 7,420,917 B2 | 9/2008 | Ishikawa et al. |
| 7,453,804 B1 | 11/2008 | Feroz et al. |
| 7,492,713 B1 | 2/2009 | Turner et al. |
| 7,496,661 B1 | 2/2009 | Morford et al. |
| 7,508,764 B2 * | 3/2009 | Back et al. ............... 370/235 |
| 7,558,981 B2 | 7/2009 | Ashmore et al. |
| 2002/0016860 A1 | 2/2002 | Garcia-Luna-Aceves et al. |
| 2002/0036983 A1 | 3/2002 | Widegren et al. |
| 2002/0107908 A1 | 8/2002 | Dharanikota |
| 2002/0116521 A1 | 8/2002 | Paul et al. |
| 2002/0122422 A1 | 9/2002 | Kenney et al. |
| 2002/0122424 A1 | 9/2002 | Kawarai et al. |
| 2002/0126623 A1 | 9/2002 | Kiendl |
| 2002/0181462 A1 | 12/2002 | Surdila et al. |
| 2003/0005112 A1 | 1/2003 | Krautkremer |
| 2003/0067903 A1 | 4/2003 | Jorgensen |
| 2003/0081546 A1 | 5/2003 | Agrawal et al. |
| 2003/0108015 A1 | 6/2003 | Li |
| 2003/0118029 A1 | 6/2003 | Maher et al. |
| 2003/0229710 A1 | 12/2003 | Lie et al. |
| 2003/0235209 A1 | 12/2003 | Garg et al. |
| 2004/0013089 A1 | 1/2004 | Taneja et al. |
| 2004/0028051 A1 | 2/2004 | Etemadi et al. |
| 2004/0071084 A1 | 4/2004 | El-Hennawey et al. |
| 2004/0111461 A1 | 6/2004 | Claudatos et al. |
| 2004/0236547 A1 * | 11/2004 | Rappaport et al. ............. 703/2 |
| 2004/0248583 A1 | 12/2004 | Satt et al. |
| 2005/0036512 A1 | 2/2005 | Loukianov |
| 2005/0041583 A1 * | 2/2005 | Su et al. ............... 370/235 |
| 2005/0041584 A1 | 2/2005 | Lau et al. |
| 2005/0068722 A1 | 3/2005 | Wei |
| 2005/0089043 A1 | 4/2005 | Seckin et al. |
| 2005/0100000 A1 | 5/2005 | Faulkner et al. |
| 2005/0141493 A1 | 6/2005 | Hardy et al. |
| 2005/0213504 A1 * | 9/2005 | Enomoto et al. ............. 370/235 |
| 2005/0254502 A1 | 11/2005 | Choi |
| 2006/0015698 A1 | 1/2006 | Kim et al. |
| 2006/0028982 A1 | 2/2006 | Wright |
| 2006/0028983 A1 | 2/2006 | Wright |
| 2006/0072451 A1 | 4/2006 | Ross |
| 2006/0077963 A1 | 4/2006 | Li et al. |
| 2006/0101159 A1 | 5/2006 | Yeh et al. |
| 2006/0114832 A1 | 6/2006 | Hamilton et al. |
| 2006/0140119 A1 | 6/2006 | Yeh et al. |
| 2006/0140128 A1 | 6/2006 | Chi et al. |
| 2006/0149841 A1 | 7/2006 | Strub |
| 2006/0153174 A1 | 7/2006 | Towns-von Stauber et al. |
| 2006/0156052 A1 | 7/2006 | Bodnar et al. |
| 2006/0233100 A1 * | 10/2006 | Luft et al. ............. 370/229 |
| 2006/0233101 A1 | 10/2006 | Luft et al. |
| 2007/0058629 A1 | 3/2007 | Luft |
| 2007/0058632 A1 * | 3/2007 | Back et al. ............. 370/392 |
| 2007/0061433 A1 * | 3/2007 | Reynolds et al. ............. 709/223 |
| 2007/0127473 A1 | 6/2007 | Kessler et al. |
| 2007/0140131 A1 | 6/2007 | Malloy et al. |
| 2007/0195872 A1 * | 8/2007 | Diaz ............... 375/222 |
| 2007/0233698 A1 | 10/2007 | Sundar et al. |
| 2007/0234364 A1 | 10/2007 | Lipton et al. |
| 2007/0280123 A1 * | 12/2007 | Atkins et al. ............. 370/252 |
| 2007/0286351 A1 * | 12/2007 | Ethier et al. ............. 379/32.01 |
| 2008/0082979 A1 | 4/2008 | Coppinger et al. |
| 2008/0104009 A1 | 5/2008 | Back et al. |
| 2008/0104085 A1 | 5/2008 | Papoutsakis et al. |
| 2008/0134327 A1 * | 6/2008 | Bharrat et al. ............. 726/22 |
| 2008/0155087 A1 | 6/2008 | Blouin et al. |
| 2008/0177424 A1 | 7/2008 | Wheeler |
| 2008/0291923 A1 | 11/2008 | Back et al. |
| 2008/0298230 A1 | 12/2008 | Luft et al. |

FOREIGN PATENT DOCUMENTS

| | | |
|---|---|---|
| CA | 2 511 997 A1 | 8/2004 |
| EP | 1093266 A2 | 4/2001 |
| WO | WO 99/30460 | 6/1999 |
| WO | WO 00/33511 A1 | 6/2000 |
| WO | WO 02/15521 A1 | 2/2002 |
| WO | WO 02/21276 A1 | 3/2002 |
| WO | WO 03/094449 A1 | 11/2003 |
| WO | WO 03/103239 A1 | 12/2003 |
| WO | WO2005/017707 A2 | 2/2005 |
| WO | WO 2005/022852 A1 | 2/2005 |
| WO | WO/2005/088929 | 9/2005 |
| WO | WO 2006/020834 A1 | 2/2006 |
| WO | WO 2007/030916 A1 | 3/2007 |
| WO | WO 2007/030917 A1 | 3/2007 |

OTHER PUBLICATIONS

Cisco Systems, "NetFlow Ecosystems Solutions, white paper", Feb. 5, 2007.*

Cisco Systems, "NetFlow Services Solutions Guide", Last updated Jan. 22, 2007, pp. 1-72, http://www.cisco.com/en/US/docs/ios/solutions_docs/netflow/nfwhite.pdf.

Cisco Systems, "NetFlow Ecosystems Solutions, white paper", Feb. 5, 2007, pp. 1-29, http://www.cisco.com/warp/public/732/Tech/nmp/netflow/docs/netflow_eco_WP.pdf.

Chakchai, So-In, "A Survey of Network Traffic Monitoring and Analysis Tools", Washington University in St. Louis, Fall 2006, pp. 1-27, http://www.rajjain.com/cse567-06/ftp/net_traffic_monitors3/index.html.

PCT/CA2008/001696, PCT International Search Report and Written Opinion of the International Searching Authority, mailed Jan. 8, 2009, 10 pages.

Gupta P. et al., "Packet Classification using Hierarchical Intelligent Cuttings", Computer Systems Laboratory, Stanford University; 1999. (Retrieved from the internet: http://tinytera.stanford.edu/~nickm/papers/HOTI_99.pdf).

Zapater, et al., "A Proposed Approach for Quality of Experience Assurance of IPTV", Proceedings of the First International Conference on the Digital Society (ICDS'07), pp. 25-30, Jan. 2007, IEEE.

Bodin, U., et al., "End-to-End QoS control architectures from a wholesale and retail perspective: benefits and challenges." [retrieved Apr. 19, 2007]. Retrieved from the Internet: www.operax.com. Operax, Tegeluddsvägen 92, SE-115 28, Stockholm, Sweden.

Gallon, C., et al., MSF Technical Report, MSF-TR-ARCH-005-Final. "Bandwidth Management in Next Generation Packet Networks." MultiService Forum. Aug. 2005. [retrieved Apr. 19, 2007]. Retrieved from the Internet: <URL: http://www.msforum.org/techinfo/reports/MSF-TR-ARCH-005-FINAL.pdf>.

Jungck, Peder, "Open Network Services Platforms for High-Value Network Services", [online], 2004 [retrieved Feb. 28, 2007]. Retrieved from the Internet: CloudShield Technologies, Inc., www.cloudshield.com. CloudShield, 212 Gibraltar Drive, Sunnyvale, California 94089.

"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.

"Arbor Peakflow SP on CS-2000: CloudShield and Arbor Networks Integrated Solution for DDoS Control." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.

"Broadband Architectures to Go Above and Beyond Triple Play." [retrieved Feb. 28, 2007]. Retrieved from the Internet: www.operax.com. Operax, Tegeluddsvägen 92, SE-115 28, Stockholm, Sweden. Sep. 2005.

"CloudShield Content Control Suite: Modular Software for Implementing Multi-Function Service Control." [retrieved Feb. 28, 2007]. Retrieved from the Internet: Technologies, Inc., www.cloudshield.com. CloudShield, 212 Gibraltar CloudShield Drive, Sunnyvale, California 94089. 2006.

"CloudShield Network Observatory: CS-2000 with 3$^{rd}$ Party Applications Bring Network Content Into Focus." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"CloudShield PacketWorks IDE: Developers' Toolkit for CS-2000 In-Network Computing Platform." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"CS-2000 Content Processing Platform: Multi-Function Systems for Controlling and Securing Next Generation Services." [retrieved Feb. 28, 2007]. Retrieved from the Internet: CloudShield Technologies, Inc., www.cloudshield.com. CloudShield, 212 Gibraltar Drive, Sunnyvale, California 94089. 2006.

"Delivering Video over IP," Microsoft Corporation, 2003.

"Efficient Network Resource Control—A Source of Competitive Advantage." [retrieved Apr. 19, 2007]. Retrieved from the Internet: www.operax.com. Operax, Tegeluddsvägen 92, SE-11528, Stockholm, Sweden. Sep. 2005.

"Ellacoya Introduces VoIP Quality Reporter (VQR)." [online] Ellacoya Networks, Inc., [retrieved Apr. 19, 2007] Retrieved from the Internet: <URL: http://www.ellacoya.com/products/vqr.shtml>.

"Ellacoya Multimedia Service Manager (MSM) PacketCable Multimedia-based Application." [online] Ellacoya Networks, Inc., [retrieved Apr. 19, 2007] Retrieved from the Internet: <URL: http://www.ellacoya.com/products/multimediaMgr.shtml>.

"Ellacoya's Scalable Distributed Architecture." [online] Ellacoya Networks, Inc., [retrieved Apr. 19, 2007] Retrieved from the Internet: <URL: http://www.ellacoya.com/products/architecture.shtml>.

"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.

"How IPv4 Multicasting Works" Microsoft TechNet, Microsoft Corporation, Mar. 28, 2003, pp. 1-32.

"How Unicast Ipv4 Routing Protocols and Services Work," Microsoft TechNet, Microsoft Corporation, Mar. 28, 2003, pp. 1-60.

"IMS and Operax Bandwidth Manager—Guaranteed QoS." [retrieved Apr. 19, 2007]. Retrieved from the Internet: www.operax.com. Operax, Tegeluddsvägen 92, SE-115 28, Stockholm, Sweden. 2006.

"Integrating Applications with teh CloudShield ONSP." [retrieved Feb. 28, 2007]. Retrived from the Internet: CloudShield Technologies, Inc., www.cloudshield.com. CloudShield, 212 Gibraltar Drive, Sunnyvale, California 94089. Aug. 2004.

"Integrated Content Control for An All IP World." [retrived Feb. 28, 2007]. Retrieved from the Internet: CloudShield Technologies, Inc., www.cloudshiled.com. CloudShield, 212 Gibraltar Drive, Sunnyvale, California 94089.

"IP Service Control System." [retrived Apr. 19, 2007] Retrieved from the Internet: Ellacoya Networks, Inc., www.ellacoya.com. Ellacoya Networks, 7 Henry Clay Drive, Merrimack, NH 03054 USA. 2005.

"Managed DDos Security Services: An Arbor Networks/CloudShield Solution." [retrived Feb. 18, 2007]. Retrived from the Internet: CloudShield Technologies, Inc., www.cloudshield.com. CloudShield, 212 Gibraltar Drive, Sunnyvale, California 94089. Aug. 2004.

"Meeting the Multi-Service IP QoS Challenges." [retrived Apr. 19, 2007]. Retrieved from the Internet: www.operax.com. Operax, Tegeluddsvägen 92, SE-115 28, Stockholm, Sweden.

"On the Road to IP Multi-Service." [retrieved Apr. 19, 2007]. Retrieved from the Internet: www.operax.com. Operax, Tegeluddsvägen 92, SE-115 28, Stockholm, Sweden.

"Operax Bandwidth Manager 5500: QoS control for the access, aggregation and edge." [retrieved Apr. 19, 2007]. Retrieved from the Internet: www.operax.com. Operax, Tegeluddsvägen 92, SE-115 28, Stockholm, Sweden. 2006.

"Operax Bandwidth Manager 5700: QoS control for IP/MPLS Networks." [retrieved Apr. 19, 2007]. Retrieved from the Internet: www.operax.com. Operax, Tegeluddsvägen 92, SE-115 28, Stockholm, Sweden. 2006.

"Operax guarantees QoS for Video Telephony: QoS guaranteed value added services." [retrieved Apr. 19, 2007]. Retrived from the Internet: www.operax.com. Operax, Tegeluddsvägen 92, SE-115 28, Stockholm, Sweden. 2005.

"Operax in IP Multimedia Subsystem (IMS): Advanced QoS control for IMS/NGN." [retrieved Apr. 19, 2007]. Retrieved from the Internet: www.operax.com. Operax. Tegeluddsvägen 92, SE-115 28, Stockholm, Sweden. 2006.

"Operax Triple Play: Service Control System." [retrieved Apr. 19, 2007]. Retrieved from the Internet: www.operax.com. Operax, Tegeluddsvägen 92, SE-115 28, Stockholm, Sweden. 2005.

"Prolexic DNS Shield on CS-2000: Prolexic and CloudShield Integrated Solution for DNS Service Protection." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"A Unified Policy Management Framework: IP Service Creation and Assurance in Coverged Networks." [retrieved Apr. 19, 2007]. Retrieved from the Internet: www.operax.com. Operax, Tegeluddsvägen 92, SE-115 28, Stockholm, Sweden. Nov. 2006.

"What is Unicast IPv4 Routing?" Microsoft TechNet, Microsoft Corporation, Mar. 28, 2003, pp. 1-6.

PCT/CA2006/000555, PCT International Search Report and Written Opinion, Jul. 26, 2006.

PCT/CA2006/000554, PCT International Search Report and Written Opinion, Aug. 1, 2006.

PCT/CA2006/001414, PCT International Search Report and Written Opinion, Dec. 19, 2006.

PCT/CA2006/001423, PCT International Search Report and Written Opinion, Dec. 18, 2006.

PCT/CA/2006/001469, PCT International Search Report and Written Opinion, Dec. 28, 2006.

"Subjective Video Quality", Retrieved from the Internet (Mar. 29, 2007); Wikipedia, the free encyclopedia http://en.wikipedia.org/wiki/subjective_video_quality.

"Mean Opinion Score", Retrieved from the Internet (Mar. 29, 2007); Wikipedia, the free encyclopedia, http://en.wikipedia.org/wiki/Mean_Opinion_Score.

Clark, Alan, "RTCP XR Measures VoIP Performance", Retrieved from the Internet (Mar. 30, 2007); Networkworld, http://www.NetworkWorld.com/news/tech/2003/1117techupdate.html.

"Real Time Control Protocol", Retrieved from the Internet (Mar. 30, 2007); Wikipedia, the free encyclopedia, http://en.wikipedia.org/wiki/RTCP.

"Simple Mail Transfer Protocol", Retrieved from the Internet (Mar. 30, 2007); Wikipedia, the free encyclopedia, http//en.wikipedia.org/wiki/Smtp.

"Simple Network Management Protocol", Retrieved from the Internet (Apr. 9, 2007); Wikipedia, the free encyclopedia, http//en.wikipedia.org/wiki/SNMP.

* cited by examiner

INTELLIGENT COLLECTION AND MANAGEMENT OF FLOW STATISTICS

TECHNICAL FIELD

This disclosure relates generally to packet based networking, and in particular but not exclusively, relates to tracking quality of service and monitoring quality of experience in a packet based network.

BACKGROUND INFORMATION

The Internet is becoming a fundamental tool used in our personal and professional lives on a daily basis. As such, the bandwidth demands placed on network elements that underpin the Internet are rapidly increasing. In order to feed the seemingly insatiable hunger for bandwidth, parallel processing techniques have been developed to scale compute power in a cost effective manner. One such bandwidth intensive task is the collection of flow statistics within a network element. Current flow statistics collection technologies are imperfect lossy collectors of statistical data and can consume almost as much bandwidth as the flows being monitored.

As our reliance on the Internet deepens, industry innovators are continually developing new and diverse applications for providing a variety of services to subscribers. However, supporting a large diversity of services and applications using parallel processing techniques within a distributed compute environment introduces a number of complexities. One such complexity is to ensure that all available compute resources in the distributed environment are efficiently shared and effectively deployed. Ensuring efficient sharing of distributed resources requires scheduling workloads amongst the distributed resources in an intelligent manner so as to avoid situations where some resources are overburdened, while others lay idle. Another such complexity is how to support new and unexpected behavior demanded by the growing diversity of services within the infrastructure of a distributed environment that has already been deployed in the field.

FIG. 1 illustrates a modern metro area network 100 for providing network services to end users or subscribers. Metro area network 100 is composed of two types of networks: a core network 102 and one of more access networks 106. Core network 102 communicates data traffic from one or more service providers 104A-104N in order to provide services to one or more subscribers 108A-108M. Services supported by the core network 102 include, but are not limited to, (1) a branded service, such as a Voice over Internet Protocol (VoIP), from a branded service provider; (2) a licensed service, such as Video on Demand (VoD) or Internet Protocol Television (IPTV), through a licensed service provider and (3) traditional Internet access through an Internet Service Provider (ISP).

Core network 102 may support a variety of protocols (Synchronous Optical Networking (SONET), Internet Protocol (IP), Packet over SONET (POS), Dense Wave Division Multiplexing (DWDM), Border Gateway Protocol (BGP), etc.) using various types of equipment (core routers, SONET add-drop multiplexers, DWDM equipment, etc.). Furthermore, core network 102 communicates data traffic from the service providers 104A-104N to access network(s) 106 across link(s) 112. In general, link(s) 112 may be a single optical, copper or wireless link or may comprise several such optical, copper or wireless link(s).

On the other hand, the access network(s) 106 complements core network 102 by aggregating the data traffic from the subscribers 108A-108M. Access network(s) 106 may support data traffic to and from a variety of types of subscribers 108A-108M, (e.g. residential, corporate, mobile, wireless, etc.). Although access network(s) 106 may not comprise of each of the types of subscriber (residential, corporate, mobile, etc), access(s) network 106 will comprise at least one subscriber. Typically, access network(s) 106 supports thousands of subscribers 108A-108M. Access networks 106 may support a variety of protocols (e.g., IP, Asynchronous Transfer Mode (ATM), Frame Relay, Ethernet, Digital Subscriber Line (DSL), Point-to-Point Protocol (PPP), PPP over Ethernet (PPPoE), etc.) using various types of equipment (Edge routers, Broadband Remote Access Servers (BRAS), Digital Subscriber Line Access Multiplexers (DSLAM), Switches, etc). Access network(s) 106 uses a subscriber policy manager(s) 110 to set policies for individual ones and/or groups of subscribers. Policies stored in a subscriber policy manager(s) 110 allow subscribers access to different ones of the service providers 104A-N. Examples of subscriber policies are bandwidth limitations, traffic flow characteristics, amount of data, allowable services, etc.

Subscriber traffic flows across access network(s) 106 and core network 102 in data packets. A data packet (also known as a "packet") is a block of user data with necessary address and administration information attached, usually in a packet header and/or footer, which allows the data network to deliver the data packet to the correct destination. Examples of data packets include, but are not limited to, IP packets, ATM cells, Ethernet frames, SONET frames and Frame Relay packets. Typically, data packets having similar characteristics (e.g., common source and destination) are referred to as a flow.

FIG. 2 represents the Open Systems Interconnect (OSI) model of a layered protocol stack 200 for transmitting data packets. Each layer installs its own header in the data packet being transmitted to control the packet through the network. The physical layer (layer 1) 202 is used for the physical signaling. The next layer, data link layer (layer 2) 204, enables transferring of data between network entities. The network layer (layer 3) 206 contains information for transferring variable length data packet between one or more networks. For example, IP addresses are contained in the network layer 206, which allows network devices (also commonly referred to a network elements) to route the data packet. Layer 4, the transport layer 208, provides transparent data transfer between end users. The session layer (layer 5) 210, provides the mechanism for managing the dialogue between end-user applications. The presentation layer (layer 6) 212 provides independence from difference in data representation (e.g. encryption, data encoding, etc.). The final layer is the application layer (layer 7) 212, which contains the actual data used by the application sending or receiving the packet. While most protocol stacks do not exactly follow the OSI model, it is commonly used to describe networks.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for monitoring subscriber quality of experience at an intermediate point between the subscriber of a service and the provider of the service are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "flow" or "packet flow" is defined herein as a sequence of related packets having common characteristics. For example, a sequence of packets moving through a network node having a common N-tuple signature may be defined as a single flow. In one embodiment, the N-tuple signature is a 6-tuple signature including the following packet fields: destination address, source address, destination port, source port, protocol, and differentiated service code point. A "classification rule" is defined herein as the combination of classification criteria with an associated action or actions to be performed on the classified packet flow. The classification criteria may be an exact match N-tuple signature or various wildcard signatures (e.g., range match, prefix match, non-contiguous bit masking match, ternary "don't care" match, etc.). The action or actions may be a forwarding action, an interception action, a bifurcation (e.g., replication) action, a termination action, some combination thereof, or various other processing actions.

Figure 1:
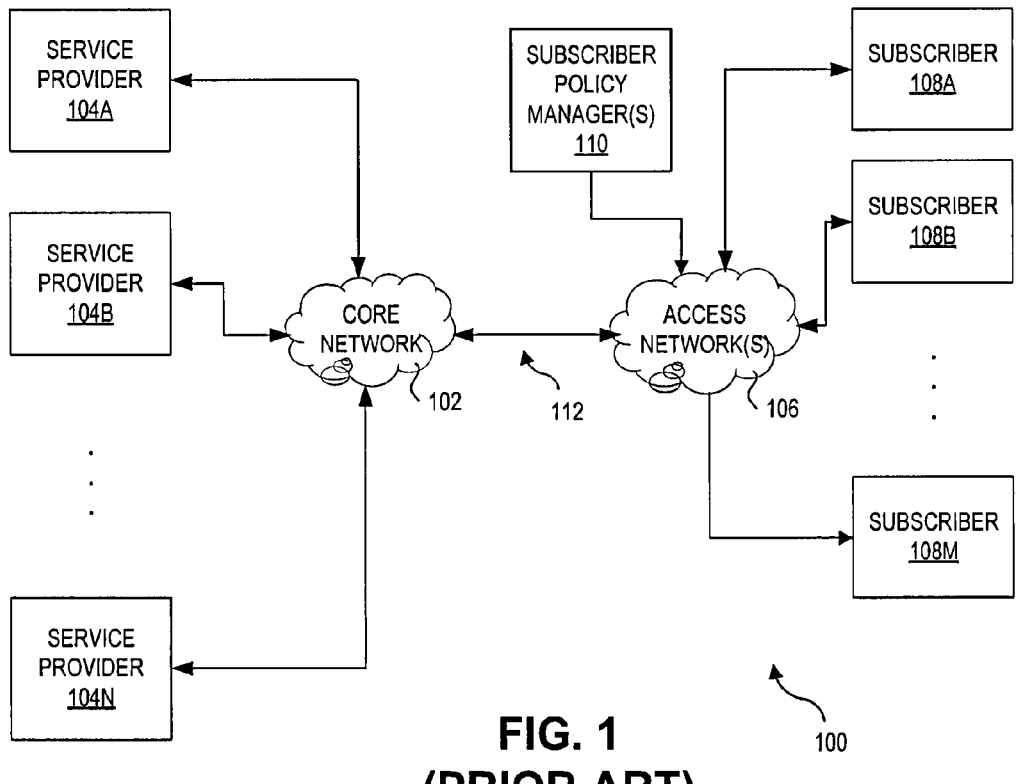
FIG. 1 (Prior Art) illustrates a typical metro area network configuration.
Figure 2:
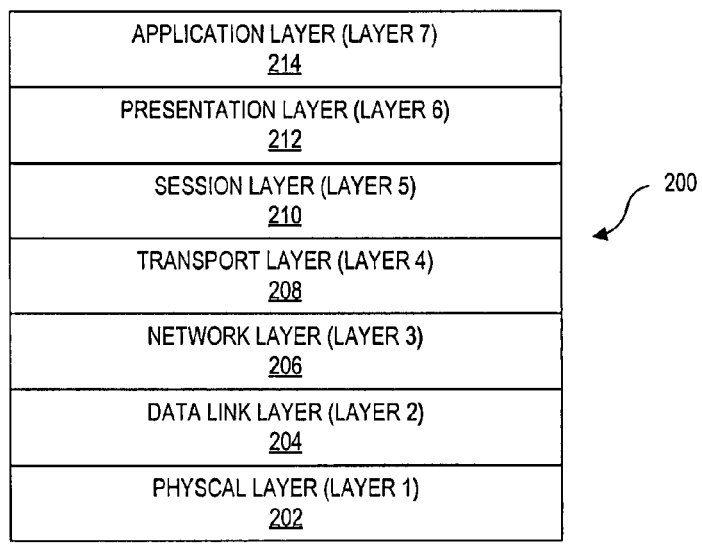
FIG. 2 (Prior Art) is a block diagram illustrating layers of the Open Systems Interconnect protocol stack.
Figure 3:
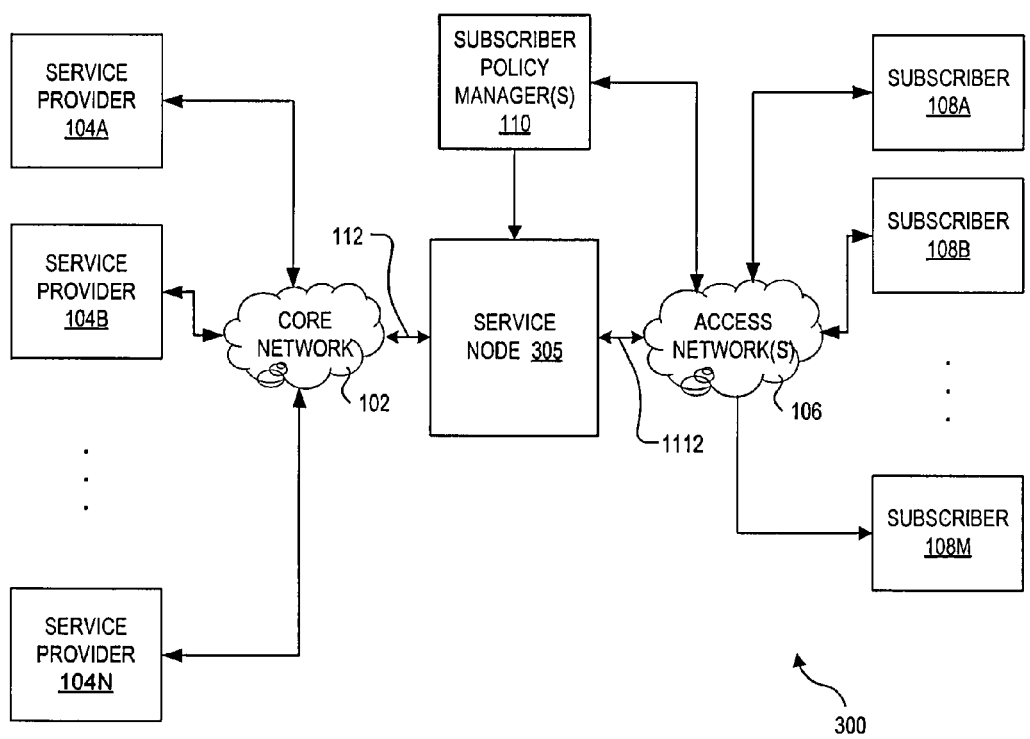
FIG. 3 is a block diagram illustrating a demonstrative metro area network configuration including a network service node to provide application and subscriber aware packet processing, in accordance with an embodiment of the invention

FIG. 3 is a block diagram illustrating a demonstrative metro area network 300 including a network service node 305 to provide application and subscriber aware packet processing, in accordance with an embodiment of the invention. Metro area network 300 is similar to metro area network 100 with the exception of network service node 305 inserted at the junction between access network 106 and core network 102.

In one embodiment, network service node 305 is an application and subscriber aware network element capable of implementing application specific policies on a per subscriber basis at line rates. For example, network service node 305 can perform quality of service ("QoS") tasks (e.g., traffic shaping, flow control, admission control, etc.) on a per subscriber, per application basis, while monitoring quality of experience ("QoE") on a per session basis. To enable QoS and QoE applications for a variety of network services (e.g., VoD, VoIP, IPTV, etc.), network service node 305 is capable of deep packet inspection all the way to the session and application layers of the OSI model. To provide this granularity of service to hundreds or thousands of unique subscribers requires leveraging parallel processing advantages of a distributed compute environment.

Figure 4:
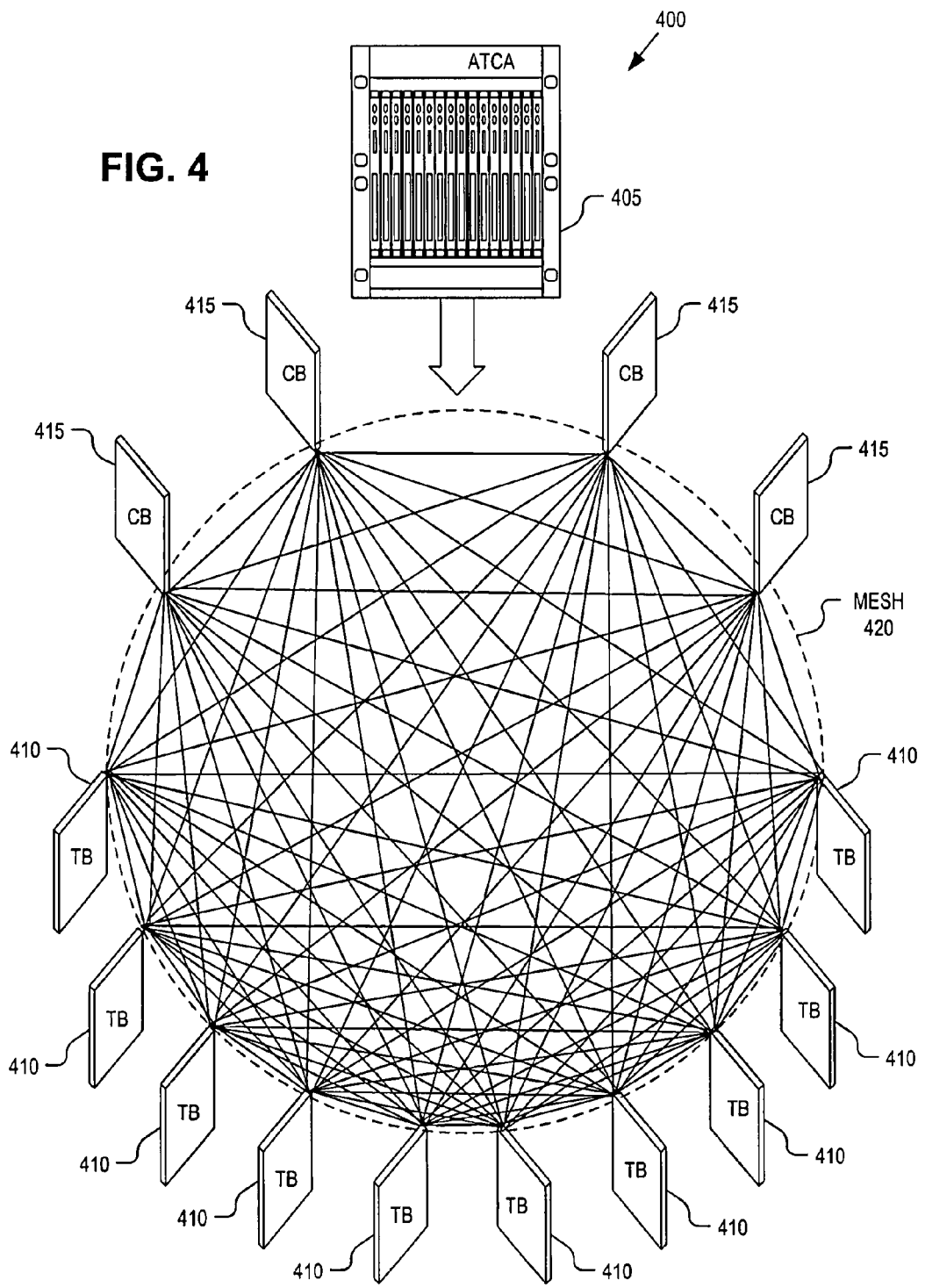
FIG. 4 is a schematic diagram illustrating one configuration of a network service node implemented using an Advanced Telecommunication and Computing Architecture chassis with full-mesh backplane connectivity, in accordance with an embodiment of the invention.

FIG. 4 is a schematic diagram illustrating a network service node 400 implemented using an Advanced Telecommunication and Computing Architecture ("ATCA") chassis with full-mesh backplane connectivity, in accordance with an embodiment of the invention. Network service node 400 is one possible implementation of network service node 305.

In the configuration illustrated in FIG. 4, an ATCA chassis 405 is fully populated with 14 ATCA blades—traffic blades ("TBs") 410 and four compute blades ("CBs") 415—each installed in a respective chassis slot. In an actual implementation, chassis 405 may be populated with less blades or may include other types or combinations of TBs 410 and CBs 415. Furthermore, chassis 405 may include slots to accept more or less total blades in other configurations (e.g., horizontal slots). As depicted by interconnection mesh 420, each blade is communicatively coupled with every other blade under the control of fabric switching operations performed by each blade's fabric switch. In one embodiment, mesh interconnect 420 provides a 10 Gbps connection between each pair of blades, with an aggregate bandwidth of 280 Gbps. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

In the illustrated embodiments, network service node 400 is implemented using a distributed architecture, wherein various processor and memory resources are distributed across multiple blades. To scale a system, one simply adds another blade. The system is further enabled to dynamically allocate processor tasks, and to automatically perform failover operations in response to a blade failure or the like. Furthermore, under an ATCA implementation, blades may be hot-swapped without taking the system down, thus supporting dynamic scaling.

Figure 5:
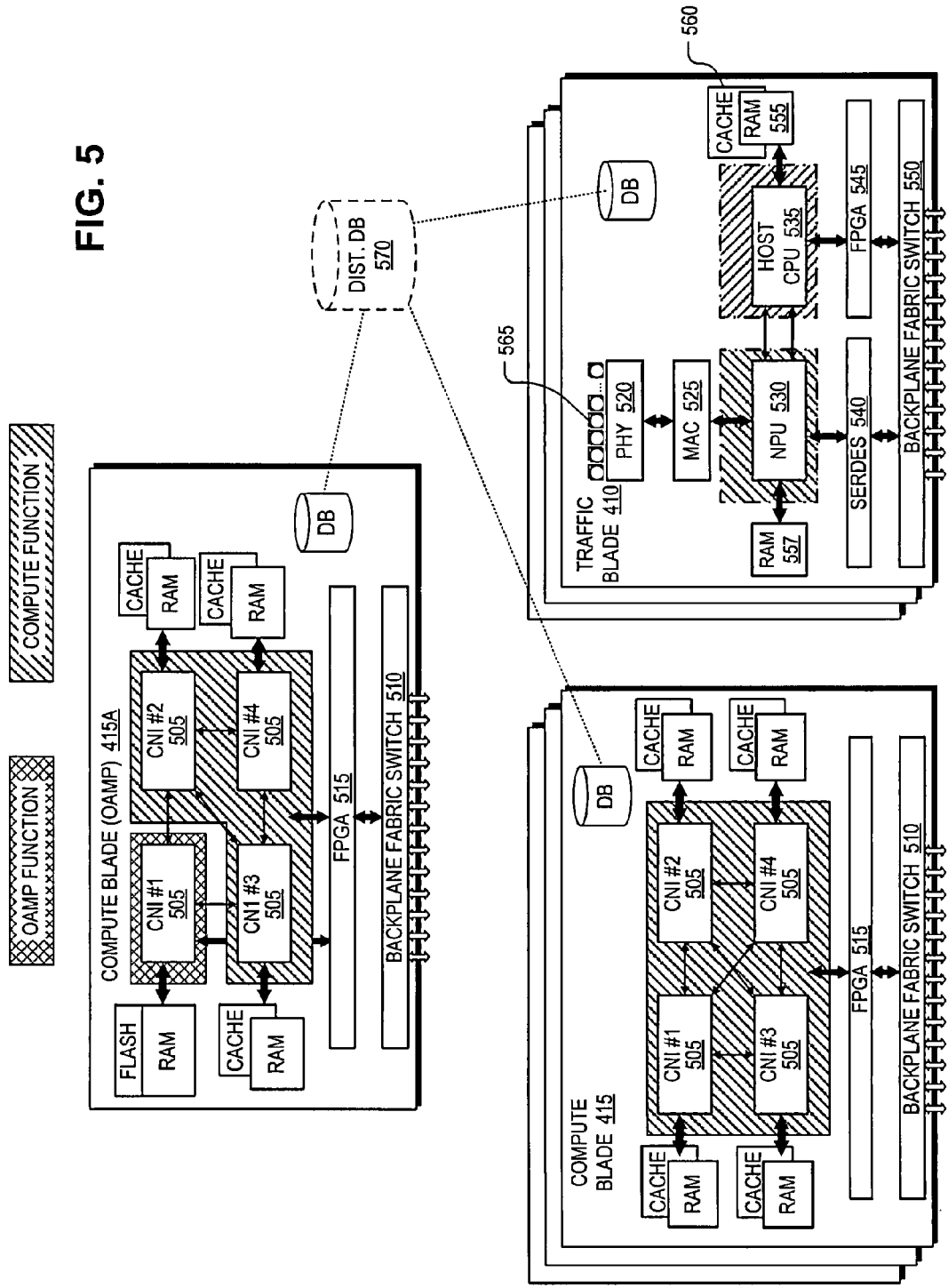
FIG. 5 is a functional block diagram illustrating traffic and compute blade architecture of a network service node for supporting application and subscriber aware packet processing, in accordance with an embodiment of the invention.

FIG. 5 is a functional block diagram illustrating demonstrative hardware architecture of TBs 410 and CBs 415 of network service node 400, in accordance with an embodiment of the invention. The illustrated embodiment of network service node 400 uses a distinct architecture for TBs 410 versus CBs 415, while at least one of CBs 415 (e.g., compute blade 415A) is provisioned to perform operations, administration, maintenance and provisioning ("OAMP") functionality (the OAMP CB).

CBs 415 each employ four compute node instances ("CNIs") 505. CNIs 505 may be implemented using separate processors or processor chips employing multiple processor cores. For example, in the illustrated embodiment of FIG. 5, each of CNI 505 is implemented via an associated symmetric multi-core processor. Each CNI 505 is enabled to communicate with other CNIs via an appropriate interface, such as for example, a "Hyper Transport" (HT) interface. Other native (standard or proprietary) interfaces between CNIs 505 may also be employed.

As further depicted in FIG. 5, each CNI 505 is allocated various memory resources, including respective RAM. Under various implementations, each CNI 505 may also be allocated an external cache, or may provide one or more levels of cache on-chip.

Each CB 415 includes an interface with mesh interconnect 420. In the illustrated embodiment of FIG. 5, this is facilitated by a backplane fabric switch 510, while a field programmable gate array ("FPGA") 515 containing appropriate programmed logic is used as an intermediary component to enable each of CNIs 505 to access backplane fabric switch 510 using native interfaces. In the illustrated embodiment, the interface between each of CNIs 505 and the FPGA 515 comprises a system packet interface ("SPI"). It is noted that these interfaces are mere examples, and that other interfaces may be employed.

In addition to local RAM, the CNI 505 associated with the OAMP function (depicted in FIG. 5 as CNI #1 of CB 415A, hereinafter referred to as the OAMP CNI) is provided with a local non-volatile store (e.g., flash memory). The non-volatile store is used to store persistent data used for the OAMP function, such as provisioning information and logs. In CBs 415 that do not support the OAMP function, each CNI 505 is provided with local RAM and a local cache.

FIG. 5 further illustrates a demonstrative architecture for TBs 410. TBs 410 include a PHY block 520, an Ethernet MAC block 525, a network processor unit (NPU) 530, a host processor 535, a serializer/deserializer ("SERDES") interface 540, an FPGA 545, a backplane fabric switch 550, RAM 555 and 557 and cache 560. TBs 410 further include one or more I/O ports 565, which are operatively coupled to PHY block 520. Depending on the particular use, the number of I/O ports 565 may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

One of the operations performed by TBs 410 is packet identification/classification. A multi-level classification hierarchy scheme is implemented for this purpose. Typically, a first level of classification, such as a 5 or 6 tuple signature classification scheme, is performed by NPU 530. Additional classification operations in the classification hierarchy may be required to fully classify a packet (e.g., identify an application flow type). In general, these higher-level classification operations are performed by CBs 415 via interception or bifurcation of packet flows at TBs 410; however, some higher-level classification may be performed by the TB's host processor 535. Classification rules used to classify packet flows may be distributed about network service node 305 via a distributed database 570. In one embodiment, one or more instances of distributed database 570 reside on each TB 410 and each CB 415. It should be appreciated that as the number of transistors capable of being integrated on a single semiconductor die continues to increase, some of the functions described herein as "control plane" functions may be migrated to the data plane and executed by NPU 530 or host CPU 535. In fact, it is foreseeable that NPU 530 and/or host CPU 535 may one day be implemented with sufficiently powerful multi-core processors capable of entirely or almost entirely assuming the tasks performed by CNIs 505.

Typically, NPUs are designed for performing particular tasks in a very efficient manner. These tasks include packet forwarding and packet classification, among other tasks related to packet processing. NPU 530 includes various interfaces for communicating with other board components. These include an Ethernet MAC interface, a memory controller (not shown) to access RAM 557, Ethernet and PCI interfaces to communicate with host processor 535, and an XGMII interface. SERDES interface 540 provides the interface between XGMII interface signals and communication protocols of backplane fabric switch 550 to enable NPU 530 to communicate over interconnection mesh 420. NPU 530 may also provide additional interfaces to interface with other components (not shown).

Similarly, host processor 535 includes various interfaces for communicating with other board components. These include the aforementioned Ethernet and PCI interfaces to communicate with NPU 530, a memory controller (on-chip or off-chip—not shown) to access RAM 555, and a pair of SPI interfaces. FPGA 545 is employed as an interface between the SPI interface signals and the HiGig interface signals.

Host processor 535 is employed for various purposes, including lower-level (in the hierarchy) packet classification, gathering and correlation of flow statistics, and application of traffic profiles. Host processor 535 may also be employed for other purposes. In general, host processor 535 will comprise a general-purpose processor or the like, and may include one or more compute cores. In one embodiment, host processor 535 is responsible for initializing and configuring NPU 530.

Figure 6:
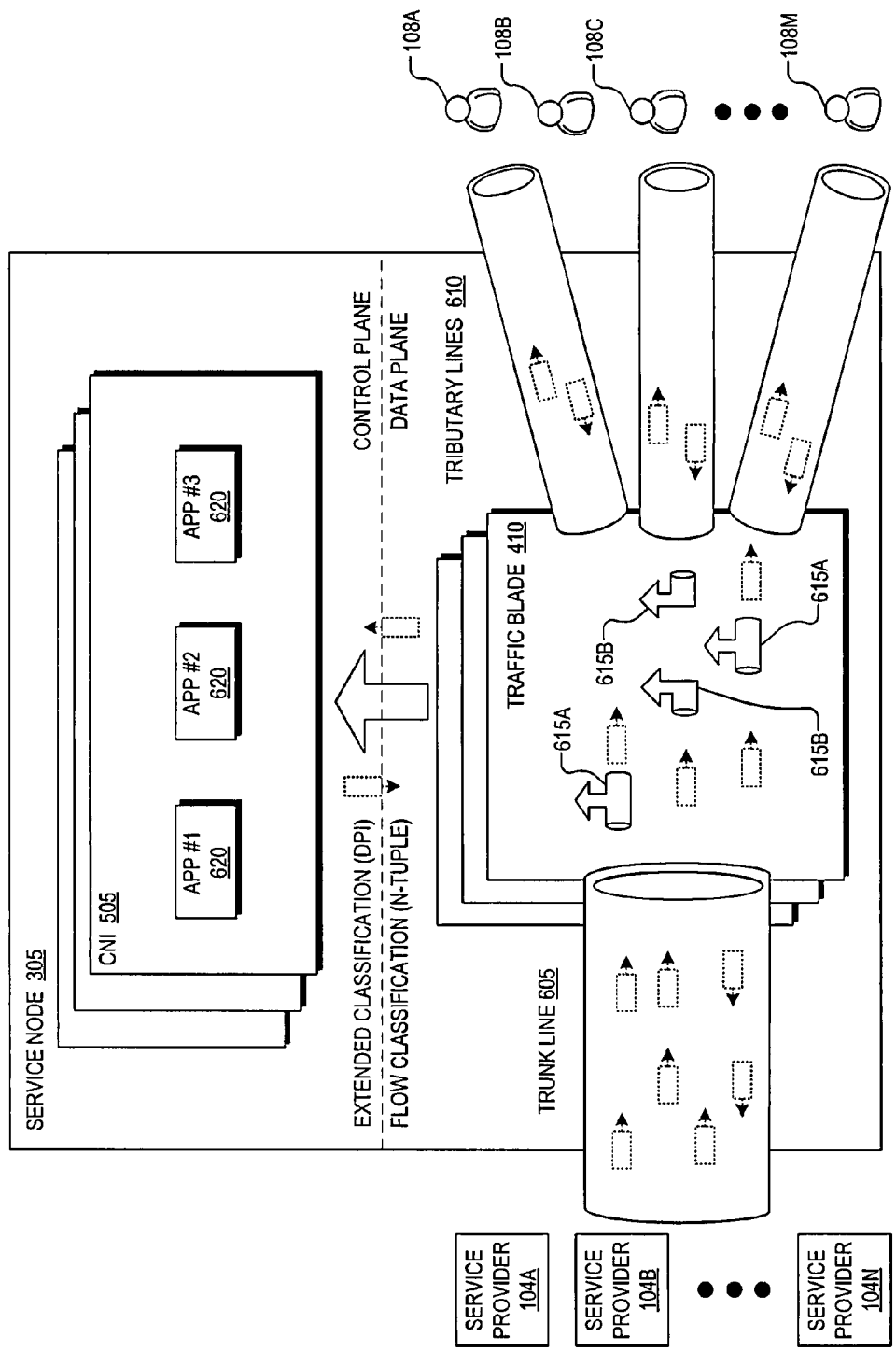
FIG. 6 is a functional block diagram illustrating multi-level packet classification scheme in a distributed compute environment, in accordance with an embodiment of the invention.

FIG. 6 is a functional block diagram illustrating a multi-level packet classification scheme executed within network service node 305, in accordance with an embodiment of the invention. The multi-level classification scheme separates packet flow classification in the data plane, where admission control and packet forwarding is executed, from the packet classification in the control plane, where deep packet inspection (e.g., packet inspection at layers 5 to 7 of the OSI model), application processing (layer 7 processing of application data within a packet flow), control processing, and other supervisory/managerial processing is executed. However, as mentioned above, future advances in processor design may result in an increased migration of stateful classification functions to the data plane.

During operation, packets arrive and depart service node 305 along trunk line 605 from/to service providers 104 and arrive and depart service node 305 along tributary lines 610 from/to subscribers 108. Upon entering TBs 410, access control is performed by comparing Internet protocol ("IP") header fields against an IP access control list ("ACL") to determine whether the packets have permission to enter service node 305. If access is granted, then network service node 305 will proceed to classify each arriving packet.

The first level of classification occurs in the data plane and is referred to as flow classification. Flow classification includes matching upon N fields (or N-tuples) of a packet to determine which classification rule to apply and then executing an action associated with the matched classification rule. TBs 410 perform flow classification in the data plane as a prerequisite to packet forwarding and/or determining whether extended classification is necessary by CBs 415 in the control plane. In one embodiment, flow classification involves 6-tuple classification performed on the TCP/IP packet headers (i.e., source address, destination address, source port, destination port, protocol field, and differentiated service code point).

Based upon the flow classification, TBs 410 may simply forward the traffic, drop the traffic, bifurcate the traffic, intercept the traffic, or otherwise. If a TB 410 determines that a bifurcation classification criteria (bifurcation filter 615A) has been matched, the TB 410 will generate a copy of the packet that is sent to one of CBs 415 for extended classification, and forward the original packet towards its destination. If a TB 410 determines that an interception classification criteria (interception filter 615B) has been matched, the TB 410 will divert the packet to one of CBs 415 for extended classification and application processing prior to forwarding the packet to its destination.

CBs 415 perform extended classification via deep packet inspection ("DPI") to further identify application level classification rules to apply to the received packet flows. Extended classification may include inspecting the bifurcated or intercepted packets at the application level to determine to which application 620 a packet flow should be routed. In one embodiment, applications 620 may perform additional application classification on the packet flows to determine the specific application processing that should be performed on a packet flow. The application classification performed by applications 620 offers a stateful tracking of protocols that may be considered a stateful application awareness mechanism. This stateful application awareness enables applications 620 to apply application specific rules to the traffic, on a per subscriber basis. For example, application #1 may be a VoIP QoE application for monitoring the quality of experience of a VoIP service, application #2 may be a VoD QoE application for monitoring the quality of experience of a VoD service, and application #3 may be an IP filtering application providing uniform resource locator ("URL") filtering to block undesirable traffic, an email filter (e.g., intercepting simple mail transfer protocol traffic), a parental control filter on an IPTV service, or otherwise. It should be appreciated that CBs 415 may execute any number of network applications 620 for implementing a variety of networking functions.

Figure 7:
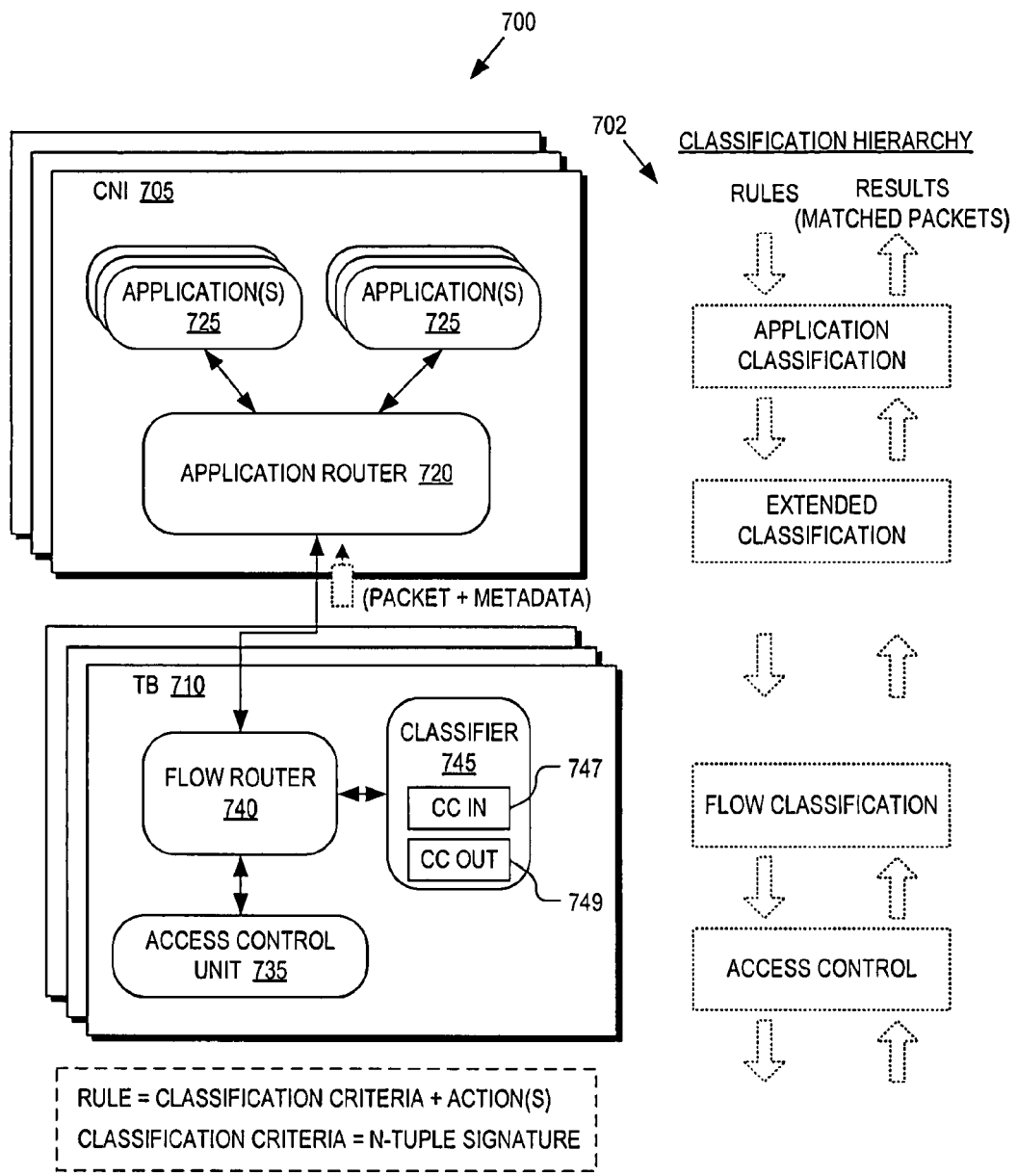
FIG. 7 is a functional block diagram illustrating distributed components for implementing a multi-level classification scheme, in accordance with an embodiment of the invention.

FIG. 7 is a functional block diagram illustrating components of a distributed compute environment 700 for implementing a multi-level classification hierarchy 702, in accordance with an embodiment of the invention. The illustrated of distributed compute environment 700 includes CNIs 705 and TBs 710. CNIs 705 may be implemented by CNIs 505 while TBs 710 may be implemented by TBs 410.

The illustrated embodiment of CNIs 705 each include an application router 720 and network applications 725 executing therein. The illustrated embodiment of TBs 710 each include an access control unit 735, a flow router 740, and a classifier 745 executing therein. FIG. 7 illustrates operational components that reside on each CNI 705 and TB 710. It should be appreciated that network service node 305 includes a plurality of CNIs 705 and therefore many instances of each operational component illustrated executing on CNI 705. Similarly, network service node 305 may include a plurality of TBs 710 and therefore many instances of each operational component illustrated executing on TB 710.

During operation, access control unit 735 executes access control to permit or deny packet flows into network service node 305. Flow router 740 and classifier 745 perform flow classification on permitted packets to classify the permitted packets into flows of related packets (i.e., packet flows). Although classifier 745 and flow router 740 are illustrated as distinct, in one embodiment, classifier 745 is a sub-element of flow router 740.

As discussed above, a classification rule is the combination of a classification criteria (e.g., N-tuple signature) and one or more actions to be executed on a packet flow matching the associated classification criteria. Classifier 745 represents a classification structure that may be implemented in hardware (e.g., ternary content addressable memory ("TCAM")), software (e.g., list, tree, trie, etc.), or some combination thereof. Classifier 745 performs the matching function to determine which classification criteria a particular packet matches, while flow router 740 executes the associated function on the particular packet (e.g., bifurcate, intercept, terminate, forward, etc.).

In one embodiment, classifier 745 operates on a first "hit" policy. In one embodiment, classifier 745 maintains two separate groups or lists of classification criteria—inbound classification criteria 747 and outbound classification criteria 749. Inbound classification criteria 747 is used to match against packets inbound to subscribers 108, while outbound classification criteria 749 is used to match against packets outbound from subscribers 108. Maintaining inbound and outbound classification criteria independent of each other simplifies the flow classification process and avoids rule masking in the scenario where two subscribers 108 are communicating with each other and all subscriber traffic is arriving or departing along tributary lines 610.

When flow router 740 determines that a particular packet is to be routed to the control plane for extended classification (e.g., intercepted or bifurcated), flow router 740 will provide the packet to an appropriate one of application routers 720 along with classification metadata. The classification metadata may include an indication of the N-tuple match determined by classifier 745 so that application router 720 need not re-execute the N-tuple matching function.

In one embodiment, flow routers 740 executing on the individual TBs 710 perform a subscriber based classification scheme. In other words, all subscriber traffic associated with the same subscriber (whether inbound or outbound) is routed to the same application router 720 executing on the same CNI 705. A subscriber based routing scheme enables applications routers 720 and/or network applications 725 to retain stateful information regarding a particular subscriber while a given session is pending or even across multiple sessions.

Application router 720 performs extended classification over and above the flow classification performed by flow router 740 to determine to which of network applications 725 a packet that has been elevated to the control plane should be routed. Extended classification may include DPI to inspect packet data at layers 5 through 7 of the OSI model. In other words, application router 720 may not merely inspect header data, but also payload data. The payload data may carry various signatures of application protocols or application data upon which extended classification criteria is matched against. For example, application router 720 may DPI search for session initiation protocol ("SIP") packets identifiable with various applications running on subscribers 108. The elevated packets may then be routed to the appropriate network application 725 for processing. Alternatively, application router 720 may execute a wildcard rule that identifies and routes all SIP packets to one or more network applications 725 for further DPI operations.

Application router 720 performs application routing to provide packets to the appropriate network applications 725. In some cases, multiple network applications 725 need to inspect the same packet. Accordingly, routing packets within a single CNI 705 need not provide redundant copies of the packet to each network application 725 (although redundant copies may be provided if advantageous). Rather, application router 720 may simply store a packet in a memory location and notify the multiple network applications 725 of its presence.

Finally, network applications 725 may perform application classification on packets promoted to network applications 725. Application classification may be performed to determine the specific action or function to perform on the packet. In some embodiments, network applications 725 are distributed applications having an instance executing on each CNI 705, as well as, a managerial instance executing on an OAMP CNI (not illustrated). Network applications 725 can manipulate packets, manipulate how packets are treated, simply monitor packets, or otherwise.

Figure 8:
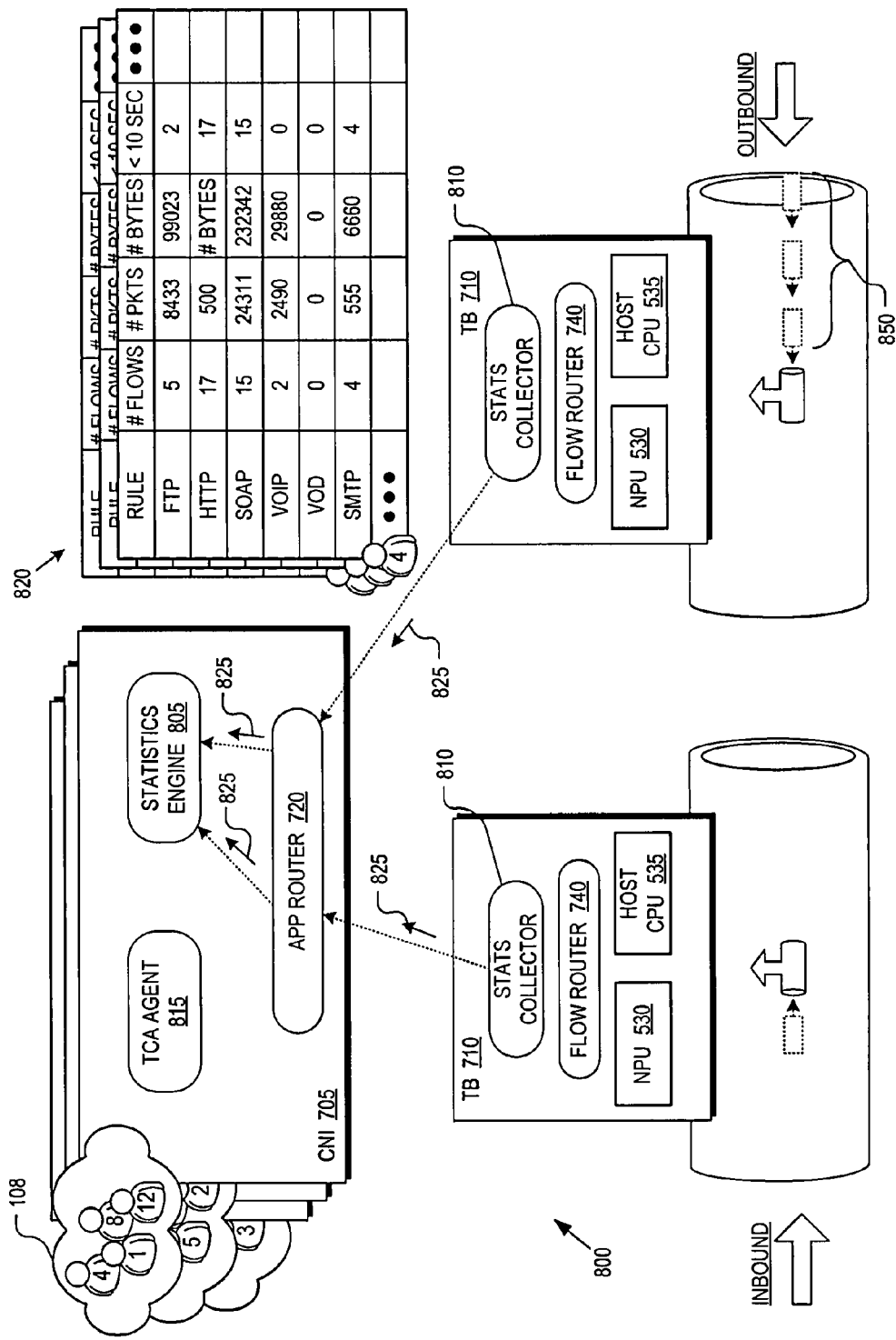
FIG. 8 is a functional block diagram illustrating components of a distributed data structure for collecting packet flow statistics in real-time within a service node, in accordance with an embodiment of the invention.

FIG. 8 is a functional block diagram illustrating components of a distributed data structure 800 for collecting packet flow statistics in real-time within service node 305, in accordance with an embodiment of the invention. The illustrated embodiment of distributed data structure 800 includes a statistics engine 805, a statistics collector 810, and a threshold crossing alert ("TCA") agent 815. Statistics engine 805 and TCA agent 815 are possible implementations of applications 620 or 725.

Each TB 710 may execute an instance of statistics collector 810 for collecting packet flow statistics from the data plane. Each instance of statistics collector 810 is responsible for collecting flow statistics related to packet flows passing through its TB 710 (e.g., packet flows being flow classified and forwarded by its TB 710). Similarly, each CNI 705 may execute an instance of statistics engine 805 and TCA agent 815 for generating statistics summaries 820 based on statistics updates 825 received from statistics collectors 810. In one embodiment, a master statistics engine executes on an OAMP CNI for generating generic flow statistics, while an agent of the master statistics engine executes on each of the CNIs 705 for collecting more specific statistics information.

In one embodiment, statistics collector 810 is executed by host CPU 535, while packet forwarding is executed by NPU 530. Alternatively, statistics collector 810 may be executed on NPU 530 itself. Each time a packet arrives at NPU 530, NPU 530 notifies statistics collector 810 executing on host CPU 535. Similarly, each time a new packet flow commences or an existing packet flow is terminated, NPU 530 may notify statistics collector 810 of these events. In fact, statistics collector 810 may collect flow statistics regarding every packet flowing through its TB 710. Statistics collector 810 may gather statistics for a period of time (e.g., 1 second) and then periodically report up to statistics engine 805 via flow updates 825.

In the illustrated embodiment, each CNI 705 is assigned to a particular subset of subscribers 108. For example, CNI 705 illustrated in FIG. 8 is assigned to process all traffic associated with subscribers 1, 4, 8, and 12 and therefore generate statistics summaries 820 for subscribers 1, 4, 8, and 12. In the illustrated embodiment, all flow updates 825 associated with the same subscriber 108 are routed to the same statistics engine 805 via flow routers 740 and application routers 720, regardless from which TB 710 the flow updates originate.

In one embodiment, all flow updates 825 associated with inbound traffic to the same subscriber 108 are routed to the same instance of statistics engine 805 while all flow updates 825 associated with outbound traffic from the same subscriber 108 are routed to the same instance of statistics engine 805. The particular instance of statistics engine 805 responsible for generating a flow summary for inbound traffic destined to a particular subscriber 108 may or may not be the same instance responsible for generating a flow summary for the outbound traffic from the particular subscriber 108. In either case, flow updates 825 are routed from TBs 710 to CNIs 705 on a subscriber basis. Accordingly, a single flow summary 820 may be maintained per subscriber 108 or two flow summaries 820 may be maintained per subscriber 108—one for inbound traffic and one for outbound traffic.

Flow summaries 820 may be tables for tracking selected flow attributes of the various packet flows passing through service node 305. The flow attributes may be tracked in columns of the tables while flow rules or statistics categories may be assigned to the rows. For example, some various statistics categories that may be tracked for any given subscriber 108 may include: file transfer protocol ("FTP") flows, hypertext transfer protocol ("HTTP") flows, simple object access protocol ("SOAP") flows, voice over Internet protocol ("VoIP") flows, video-on-demand ("VoD") flows, simple mail transfer protocol ("SMTP") flows, or otherwise. For each statistics category (row) a number of flow attributes (columns) may be tracked for the particular subscriber 108 including: number of flows, number of packets, number of bytes, number of short-term flows (e.g., flow lasting less than 10 seconds), number of long-term flows (e.g., flows lasting longer than 10 seconds), number of inbound flows, number of outbound flows, number of dropped packets, number of flows with a specified differentiated service, or number of flows with faults.

In one embodiment, network applications 725 can "tag" flows with application tags. In response, statistics engine 805 can use these tags to group or "bin" flows based upon these tags into one or more flow summary 820. Thus, rows of flow summaries 820 can be used to track both N-tuple rules and application tags. In this way, a network application 725 can intelligently track groups of flows that otherwise may not be identified. For example, a network application 725 could deep packet inspect the session description protocol ("SDP") of a SIP packet to pull out media flows, tag them, and allow statistics engine 805 to group these flows under a "VOIP" bin.

Figure 9:
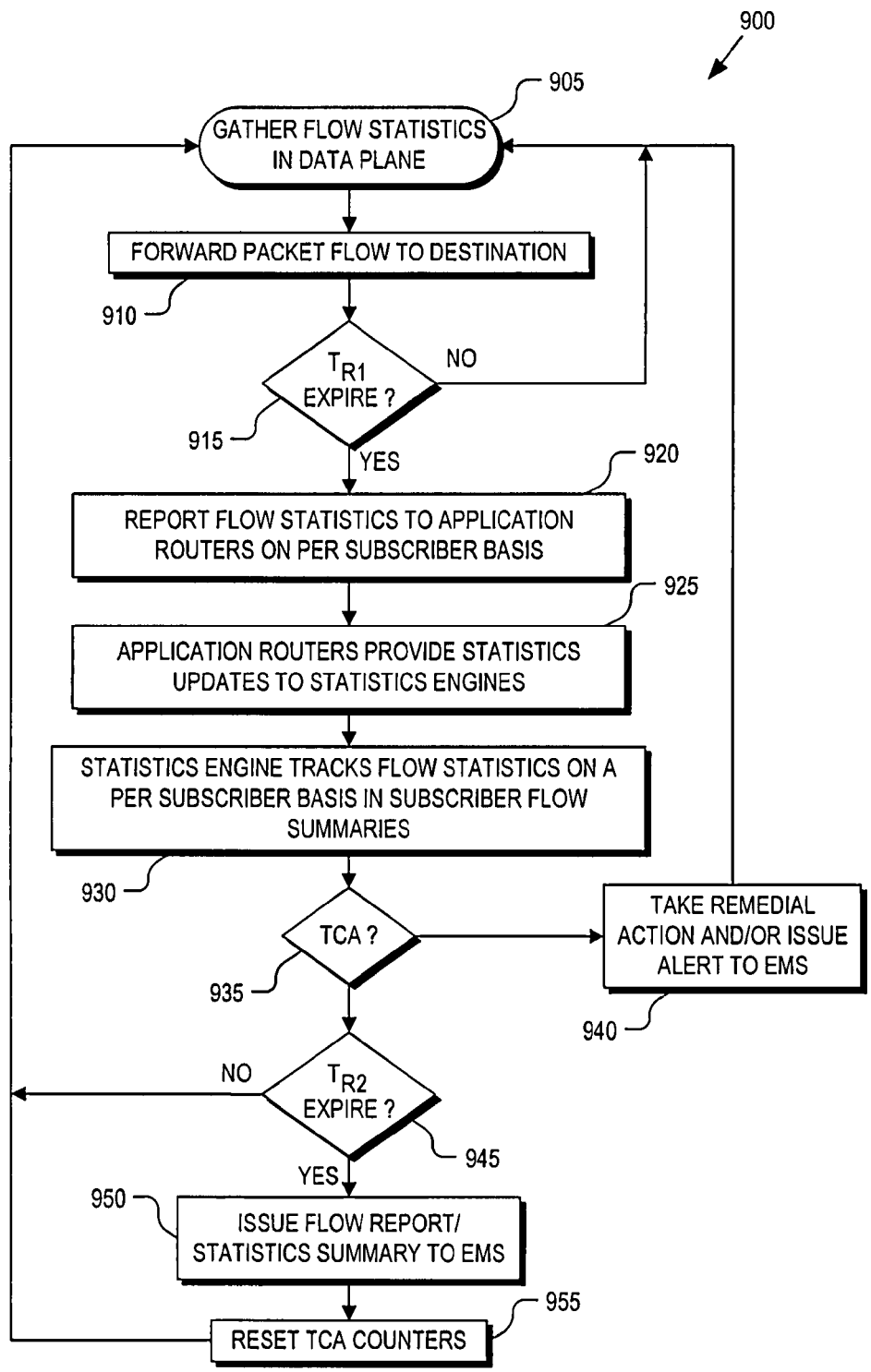
FIG. 9 is a flow chart illustrating a process for collecting packet flow statistics in real-time within a service node, in accordance with an embodiment of the invention.

FIG. 9 is a flow chart illustrating a process 900 for collecting packet flow statistics in real-time within service node 305 using distributed data structure 800, in accordance with an embodiment of the invention. Process 900 is described with reference to FIG. 8. It should be appreciated that the order in which some or all of the process blocks appear in each process should not be deemed limiting. Rather, one of ordinary skill in the art having the benefit of the present disclosure will understand that some of the process blocks may be executed in a variety of orders not illustrated including in parallel.

Process 900 illustrates how statistical data is collected for a single packet flow by distributed data structure 800; however, it should be appreciated that at any given time many packet flows may be passing through service node 305 from which flow statistics are collected in a similar manner in parallel. Upon creation of a new packet flow 850 (e.g., reception of a session initiation packet), statistics collector 810 is notified by NPU 530 and thus commences gathering flow statistics about new packet flow 850 (process block 905). Once notification is provided to statistics collector 810 (or in parallel therewith), NPU 530 classifies and forwards packet flow 850 towards its destination (process block 910).

Statistics collector 810 collects statistics regarding packet flow 850 by receiving updates from NPU 530 for each new packet that arrives within packet flow 850. Statistics collector 810 continues to collect the statistical information until a reporting period $T_{R1}$ expires (decision block 915). Upon expiration of reporting period $T_{R1}$, statistics collector 810 reports the statistical information up to statistics engine 805 within statistics updates 825. Statistics updates 825 may include one or more of statistical information related to a new packet flow commenced since the last statistics update 825 was issued, additional statistical information regarding persistent packet flows, or final statistical information regarding packet flows that terminated since the last statistics update 825. In one embodiment, statistics collector 810 periodically reports up to the control plane in one second intervals (i.e., $T_{R1}=1$ sec). Of course, other intervals may be implemented.

In a process block 920, statistics updates 825 are routed to the appropriate application router 720 on the pertinent CNI 705 via flow router 740. Flow router 740 routes statistics updates 825 using a subscriber based routing mechanism. Accordingly, each CNI 705 is assigned to process flow statistics associated with a subset of subscribers 108. Flow router 740 operates to ensure that all flow statistics collected from packet flows associated with a subscriber are forwarded up to the appropriate CNI 705. In this manner, statistics collection, summarizing, and reporting can be distributed through out service node 305 on a per subscriber basis. Furthermore, since flows associated with a single subscriber 108 are routed to the same CNI 705 and tracked by the same statistics engine 805, state full statistical data for a single subscriber 108 can be gathered, tracked, summarized, and processed across multiple communications sessions, over multiple packet flows, and for a variety of different protocols (e.g., FTP, HTTP, SOAP, VOIP, VOD, SMTP, etc.).

Since each CNI 705 may be executing a number of network applications 620 or 725, each application router 720 performs application routing to ensure statistics updates 825 are forwarded to the instance of statistics engine 805 (process block 925) located on its CNI 705. Once routed to statistics engine 805, statistics engine 805 adds the flow information contained within statistics updates 825 to statistics summaries 820. In one embodiment, statistics engine 805 adds the update information within statistics updates 825 to statistics summaries 820 by incrementing the attribute values within each table when the corresponding flow attribute is found to be present in the corresponding packet flow and reported via a statistics update 825.

As statistics engine 805 maintains and updates statistics summaries 820, TCA agent 815 monitors one or more attribute values for TCAs in real-time. For example, TCA agent 815 may monitor the "number of flows" column for the SMTP rule for each subscriber 108 assigned to its CNI 705. If more than a threshold number of SMTP flows are counted by statistics engine 805 within a given period of time for an individual subscriber 108 (decision block 935), then TCA agent 815 may issue a TCA (process block 940). TCA agent 815 may take remedial action itself, or the TCA may be issued to other network applications executing on CNI 705 or other CNIs 705 (e.g., an OAMP CNI) to take remedial action in real-time. The remedial action may include installing new access control rules into the ACL of the data plane, issuing an alert to an external management server ("EMS"), or otherwise. In the example of TCA agent 815 monitoring the SMTP category for TCAs, an identification that a threshold number of SMTP flows has been exceed within a given time period, may be an indication that the corresponding subscriber 108 has be infected with an email virus that is attempting to infect other computers by sending out large numbers of emails, or may be a mechanism to block email spammers.

TCA agent 815 may be configured to monitor any or all of the attribute value counts within the columns of statistics summaries 820 for TCAs. The response to TCAs on each of the columns may be diverse. Furthermore, the response or remedial action may be executed in real-time with remedial action decisions or policy based responses determined and executed internal to network service node 305 without external intervention. Alternatively, with reference to FIG. 10, service nodes 305 may issue TCAs 1001 to EMS 1105. In response to TCAs 1001, EMS 1105 may issue policy directives to the sending service node 305 or simply log the TCA.

Figure 10:
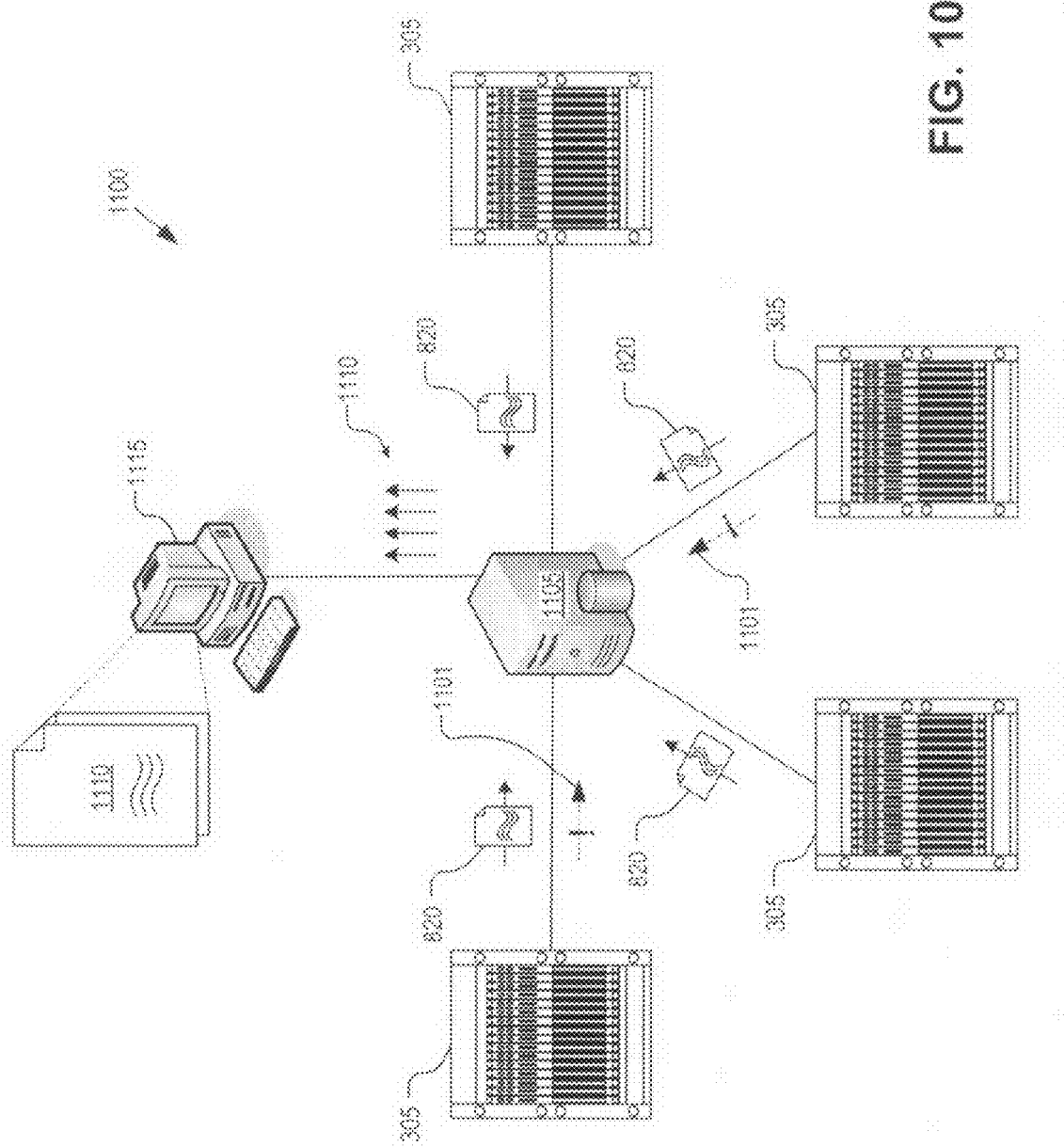
FIG. 10 illustrates a system of service nodes for transmitting statistics summaries to an external management server, in accordance with an embodiment of the invention.

Statistics engine 805 receives statistics updates 825 on a periodic basis from application router 720 and maintains statistics updates 820 up-to-date. Similarly, statistics engine 805 may report statistics summaries 820 to EMS 1105 on a periodic basis. FIG. 10 illustrates service nodes 305 transmitting statistics summaries 820 to EMS 1105, in accordance with an embodiment of the invention. In a decision block 945, if a reporting period $T_{R2}$ expires, statistics engine 805 transmits its statistics summaries 820 to EMS 1105 (process block 950). In one embodiment, reporting period $T_{R2}$ is approximately equal to 15 minute intervals; however, other intervals greater than $T_{R1}$ may also be implemented. The statistics summaries 820 transmitted to EMS 1105 may be aggregated and merged by EMS 1105 to generate aggregated statistics summaries 1110 for reference on a remote terminal 1115. As updated statistics summaries 820 are received from service nodes 305, aggregated statistics summaries 1110 are updated with the new data.

After a statistics summary 820 is transmitted to EMS 1105, TCA counters are reset (process block 955). Resetting TCA counters may simply include resetting the attribute counts in each column of statistics summaries 820 to allow statistics engine 805 to gather a fresh set of attribute values corresponding to the flow attributes. Alternatively, TCA agent 815 may maintain internal TCA counters that are periodically reset (e.g., reset upon transmitting statistics summaries 820 to EMS 1105).

In one embodiment, flow statistics rules or flow categories for tracking flow attributes may come in one of two flavors: subscriber rules and context rules. Subscriber rules are rules created for tracking a particular category for a single subscriber (e.g., tracking HTTP flows for subscriber 4). Context rules are rules created for tracking a particular category or context of flow attributes. Once a context rule is created, subscribers may be added to the context rule. By adding a particular subscriber 108 to a context rule, that subscriber's statistics summary 820 inherits all tracking rules associated with the context. For example, a context rule may be created for tracking flow attributes associated with VOD and VOIP flows. By adding subscriber 4 to this context rule, VOD and VOIP tracking rules will be added as rows to the statistics summary 820 associated with subscriber 4.

Figure 11:
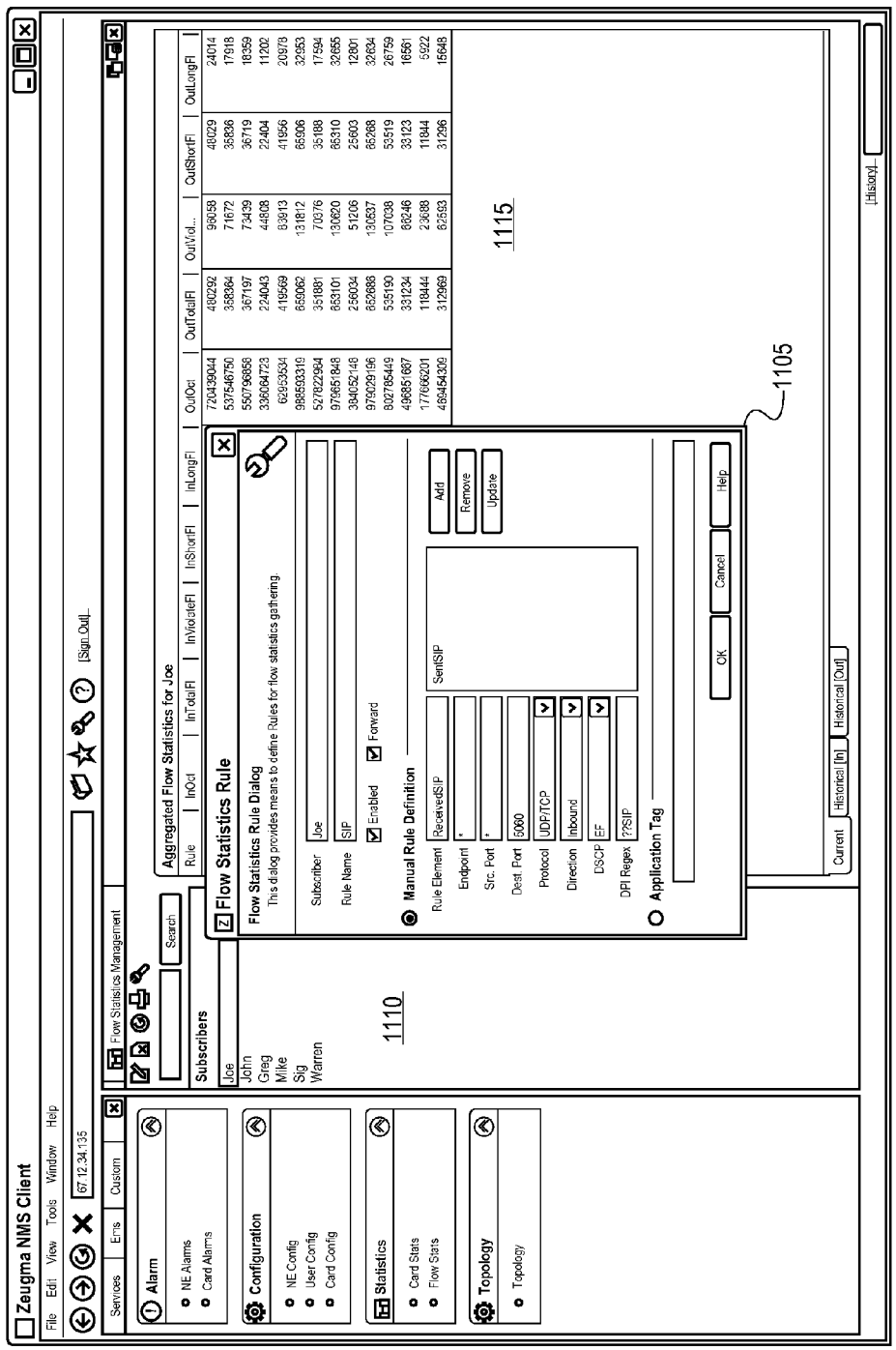
FIG. 11 is an example graphical user interface for creating subscriber rules and context rules for collecting packet flow statistics on a per subscriber basis, in accordance with an embodiment of the invention.

FIG. 11 is an example graphical user interface ("GUI") 1100 for creating subscriber rules or context rules, in accordance with an embodiment of the invention. FIG. 11 illustrates a dialog box 1105 for creating a subscriber rule for subscriber "JOE" named "SIP" for tracking session initiation packets associated with subscriber JOE. Dialog box 1105 allows a user to define rule characteristics such as 5 or 6 tuple characteristics of flows, as well as, define whether to track inbound or outbound flows. The aggregated rules for a particular subscriber may be viewed by clicking on the subscriber name in field 1110. Once a subscriber is selected from field 1110, the subscribers statistics summary is displayed in filed 1115.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
    forwarding packet flows received at a network node between subscribers of one or more network services and one or more providers of the network services;
    collecting flow statistics within a data plane of the network node to generate flow statistics updates, the flow statistics being related to each of the packet flows passing through the network node;
    providing the flow statistics updates to a plurality of statistics engines executing in a control plane of the network node;
    generating statistics summaries by the statistics engines within the network node, the statistics summaries summarizing the flow statistics on a per subscriber basis, each of the statistics engines being assigned a different subset of the plurality of subscribers to track the flow statistics associated with the different subset and to generate the statistics summaries for the different subset of the plurality of subscribers; and
    updating the statistics summaries with the flow statistics updates received from the data plane.

2. The method of claim 1, wherein providing the flow statistics updates to the plurality of statistics engines executing in the control plane of the network node includes:
    periodically providing the flow statistics updates to the plurality of statistics engines executing in the control plane.

3. The method of claim 2, wherein:
    the control plane includes a plurality of compute node instances each executing one of the plurality of statistics engines; and
    the data plane includes a plurality of traffic blades each performing traffic forwarding of the packet flows and executing a statistics collector to collect the flow statistics within the data plane.

4. The method of claim 1, further comprising periodically reporting the statistics summaries to an external management server ("EMS").

5. The method of claim 4, further comprising merging the statistics summaries reported to the EMS into a multi-subscriber summary summarizing the flow statistics related to a plurality of subscribers.

6. The method of claim 4, wherein each of the statistics summaries includes a table for tracking flow attributes for a corresponding one of the subscribers, the method further comprising:
    incrementing an attribute count associated with one of the flow attributes in response to a determination that the one of the flow attributes was present in one of the packet flows of the corresponding one of the subscribers.

7. The method of claim 6, further comprising:
    monitoring the attribute count in real-time; and
    issuing a threshold crossing alert ("TCA") if the attribute count exceeds a threshold value.

8. The method of claim 7, further comprising resetting the attribute count upon reporting one of the statistics summaries corresponding to the one of the subscribers to the EMS.

9. The method of claim 7, further comprising:
    updating an access control list of the network node in real-time in response to the TCA; and
    denying access to the network node in response to the updating of the access control list.

10. The method of claim 6, wherein the flow attributes for the corresponding one of the subscribers include at least one of: number of flows, number of packets, number of bytes, number of short-term flows, number of long-term flows, number of inbound flows, number of outbound flows, number of dropped packets, number of flows with a specified differentiated service, or number of flows with faults.

11. The method of claim 10, wherein the flow attributes for the corresponding one of the subscribers are tracked on a per category basis, wherein categories include one or more of file transfer protocol ("FTP") flows, hypertext transfer protocol ("HTTP") flows, simple object access protocol ("SOAP") flows, voice over Internet protocol ("VoIP") flows, video-on-demand ("VoD") flows, or simple mail transfer protocol ("SMTP") flows.

12. The method of claim 1, further comprising:
    providing a context based tracking rule for tracking specified flow attributes within the packet flows; and
    associating two or more of the subscribers with the context based tracking rule to monitor the specified flow attributes for each of the two or more subscribers associated with the context based tracking rule.

13. A non-transitory machine-accessible medium that provides instructions that, when executed by one or more processors, will cause the one or more processors to perform operations comprising:
    forwarding packet flows received at a network node between subscribers of one or more network services and one or more providers of the network services;
    collecting flow statistics within a data plane of the network node to generate flow statistics updates, the flow statistics being related to each of the packet flows passing through the network node;
    providing the flow statistics updates to a plurality of statistics engines executing in a control plane of the network node;
    generating statistics summaries in real-time within the network node summarizing the flow statistics on a per subscriber basis, each of the statistics engines being assigned a different subset of the plurality of subscribers to track the flow statistics associated with the different subset and to generate the statistics summaries for the different subset of the plurality of subscribers; and updating the statistics summaries with the flow statistics updates received from the data plane.

14. The non-transitory machine-accessible medium of claim 13 wherein providing the flow statistics updates to the plurality of statistics engines executing in the control plane of the network node includes:

periodically providing the flow statistics updates to the plurality of statistics engines executing in the control plane.

15. The non-transitory machine-accessible medium of claim 14 wherein:

the control plane includes a plurality of compute node instances each executing one of the plurality of statistics engines; and the data plane includes a plurality of traffic blades each performing traffic forwarding of the packet flows and executing a statistics collector to collect the flow statistics within the data plane.

16. The non-transitory machine-accessible medium of claim 13, further providing instructions that, when executed by the one or more processors, will cause the one or more processors to perform further operations, comprising:

periodically reporting the statistics summaries to an external management server ("EMS").

17. The non-transitory machine-accessible medium of claim 16, wherein each of the statistics summaries includes a table for tracking flow attributes for a corresponding one of the subscribers, the machine-accessible media further providing instructions that, when executed by the one or more processors, will cause the one or more processors to perform further operations, including:

incrementing an attribute count associated with one of the flow attributes in response to a determination that the one of the flow attributes was present in one of the packet flows of the corresponding one of the subscribers.

18. The non-transitory machine-accessible medium of claim 17, further providing instructions that, when executed by the one or more processors, will cause the one or more processors to perform further operations, including:

monitoring the attribute count in real-time; and issuing a threshold crossing alert ("TCA") if the attribute count exceeds a threshold value.

19. The non-transitory machine-accessible medium of claim 18, further providing instructions that, when executed by the one or more processors, will cause the one or more processors to perform further operations, including:

resetting the attribute count upon reporting one of the statistics summaries corresponding to the one of the subscribers to the EMS.

20. The non-transitory machine-accessible medium of claim 18, further providing instructions that, when executed by the one or more processors, will cause the one or more processors to perform further operations, including:

updating an access control list of the network node in real-time in response to the TCA; and denying access to the network node in response to the updating of the access control list.

21. The non-transitory machine-accessible medium of claim 13, further providing instructions that, when executed by the one or more processors, will cause the one or more processors to perform further operations, including:

providing a context based tracking rule for tracking specified flow attributes within the packet flows; and associating two or more of the subscribers with the context based tracking rule to monitor the specified flow attributes for each of the two or more subscribers associated with the context based tracking rule.

22. A network node for coupling between a plurality of subscribers of network services and providers of the network services, the network node comprising a plurality of processors and computer readable media, the computer readable media containing a distributed data structure for execution by the plurality of processors, the distributed data structure comprising:

a plurality of statistics collectors configured to collect flow statistics related to packet flows passing through the network node; and a plurality of statistics engines configured to receive the flow statistics from the statistics collectors and to generate statistics summaries in real-time summarizing the flow statistics on a per subscriber basis, each of the statistics engines configured to generate the statistics summaries for a different subset of the plurality of subscribers.

23. The network node of claim 22, further comprising:

a plurality of traffic blades each including one or more of the processors, the traffic blades configured to perform packet forwarding on the packet flows and to execute the statistics collectors;

a plurality of compute blades each including one or more of the processors, the compute blades configured to execute the statistics engines; and a mesh interconnect configured to communicatively interconnect the traffic blades and the compute blades.

24. The network node of claim 23, wherein:

the statistics collectors collect the flow statistics to generate flow statistics updates and periodically provide the flow statistics updates to the statistics engines; and the statistics engines update the statistics summaries with the flow statistics updates, wherein the flow statistics updates collected from outbound packet flows from a single subscriber are all-provided to a single one of the statistics engines.

25. The network node of claim 22, wherein the statistics engines are further configured to periodically report the statistics summaries to an external management server.

26. The network node of claim 22, wherein the statistics engines are further configured:

to generate each of the statistics summaries as a table for tracking flow attributes for a corresponding one of the subscribers; and to increment an attribute count associated with one of the flow attributes in response to a determination that the one of the flow attributes was present in one of the packet flows of the corresponding one of the subscribers.

27. The network node of claim 26, wherein the distributed data structure further comprises a plurality of threshold crossing alert ("TCA") agents configured to monitor attribute value counts associated with flow attributes of the packet flows, wherein the attribute value counts are accumulated within the statistics summaries, the TCA agents further configured to issue TCAs in real-time if one or more attribute value counts exceed threshold values set for the one or more flow attributes.

28. The network node of claim 26, further comprising an access control list ("ACL") for determining whether the packet flows are permitted access to the system, the TCA agent configured to install access rules into the ACL in response to one of the TCAs.

* * * * *